US008955629B2

(12) United States Patent
Toda et al.

(10) Patent No.: US 8,955,629 B2
(45) Date of Patent: Feb. 17, 2015

(54) RADIATOR STRUCTURE FOR SADDLE-RIDE TYPE VEHICLE

(71) Applicant: Honda Motor Co., Ltd., Tokyo (JP)

(72) Inventors: Munehiro Toda, Wako (JP); Katsutaka Hattori, Wako (JP); Masaomi Yamada, Wako (JP); Yusuke Inoue, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 128 days.

(21) Appl. No.: 13/672,357

(22) Filed: Nov. 8, 2012

(65) Prior Publication Data

US 2013/0118822 A1 May 16, 2013

(30) Foreign Application Priority Data

Nov. 16, 2011 (JP) ................... 2011-250936

(51) Int. Cl.
*B60K 11/04* (2006.01)
*F28D 1/06* (2006.01)
*F28F 9/00* (2006.01)
*F28D 1/04* (2006.01)

(52) U.S. Cl.
CPC . *B60K 11/04* (2013.01); *F28D 1/06* (2013.01); *F28F 9/002* (2013.01); *F28D 1/0443* (2013.01)
USPC ...................................... 180/68.4

(58) Field of Classification Search
CPC ......... B60K 11/04; F28D 1/0443; F28D 1/06; F28F 9/002; F01P 3/18
USPC ................... 180/68.4, 229; 165/148
See application file for complete search history.

(56) References Cited

U.S. PATENT DOCUMENTS

| 5,407,161 A * | 4/1995 | Mulkeran ................... 248/232 |
| 5,558,310 A * | 9/1996 | Furuie et al. ................. 248/573 |
| 5,992,554 A * | 11/1999 | Hasumi et al. ............... 180/229 |
| 6,332,505 B1 * | 12/2001 | Tateshima et al. ........... 180/229 |
| 6,349,928 B1 * | 2/2002 | Ko ............................. 267/141.4 |
| 6,695,089 B2 * | 2/2004 | Adachi et al. ................ 180/311 |
| 7,506,713 B2 * | 3/2009 | Miura et al. ................. 180/68.4 |
| 2007/0062671 A1 * | 3/2007 | Sugimoto et al. .............. 165/67 |
| 2007/0209372 A1 * | 9/2007 | Mazzocco et al. ............. 62/67 |

FOREIGN PATENT DOCUMENTS

JP          4333521 A      3/2006

* cited by examiner

Primary Examiner — J. Allen Shriver, II
Assistant Examiner — Brian Cassidy
(74) Attorney, Agent, or Firm — Birch, Stewart, Kolasch & Birch, LLP

(57) ABSTRACT

A radiator structure includes a radiator body having a core composed of radiating fins and cooling water passing tubes alternately laminated and a bracket disposed at one end of the core. The bracket includes an extension portion disposed at a vehicle widthwise inner end of the core and extending along a vehicle front-rear direction. The extension portion has a fixing portion on a leading end thereof, the fixing portion being fixed to a mounting portion of a body frame. An indentation is provided in a portion of an opposed sidewall where a front end of the core and the opposed sidewall of the bracket overlap each other when the vehicle is viewed from the side and which overlaps the fixing portion at least in the vehicle front-rear direction. The indentation is formed by bending the opposed sidewall in a direction away from the front end.

12 Claims, 17 Drawing Sheets

RADIATOR STRUCTURE FOR SADDLE-RIDE TYPE VEHICLE

CROSS-REFERENCE TO RELATED APPLICATIONS

The present application claims priority under 35 USC 119 to Japanese Patent Application No. 2011-250936 filed Nov. 16, 2011 the entire contents of which are hereby incorporated by reference.

BACKGROUND OF THE INVENTION

1. Field of the Invention

The present invention relates to a radiator structure, and more particularly, to a radiator structure for a saddle-ride type vehicle such as a motorcycle.

2. Description of Background Art

In a related art radiator for a saddle-ride type vehicle, a radiator body is composed of a core with radiating fins and fluid flow tubes alternately laminated, and tanks at upper and lower ends of the core. The radiator body is fixed to a body frame and a cowl through a pair of brackets. See, for example, JP Patent No. 4333521.

In the above-described radiator supporting structure, a predetermined clearance is provided between the core and the brackets, and by using the clearance as a crushable zone, the radiator body is protected from external force.

In the case of the structure, such as this radiator supporting structure, in which a clearance is provided between the brackets and the core, a space for the clearance becomes necessary, and therefore there is a space-related problem with respect to providing a reduction in the size of the radiator body. Also, there is a structure that is increased in stiffness by laying a plurality of plate materials for the bracket one upon the other in order to increase retention forces for retaining the radiator body with the brackets. Unfortunately, this structure not only has the problem of a large increase in weight, but also an increase in cost.

Accordingly, the present invention has been made in view of the foregoing, and an object of an embodiment of the present invention is to provide a radiator structure for a saddle-ride type vehicle capable of addressing the related art problems such as space, weight, and cost, while providing the capable of effectively protecting a radiator body.

In order to accomplish the above-mentioned object, a feature of the invention according to an embodiment provides, a radiator structure for a saddle-ride type vehicle that includes a radiator body having a core composed of radiating fins and tubes for cooling water alternately laminated; an upper tank and a lower tank connected to each end in a longitudinal direction of the tubes to allow storage of the cooling water; and a bracket disposed at one end of the core; the radiator body being fixed to a body frame through the bracket.

The bracket includes an extension portion disposed at a vehicle widthwise inner end of the core and extending along a vehicle front-rear direction, the extension portion has a fixing portion on a leading end thereof, and the fixing portion is fixed to a mounting portion of the body frame.

The bracket has an opposed sidewall. The opposed sidewall is provided with an indentation. The indentation is formed in a portion of the opposed sidewall overlapping a front end of the core when viewed from the side of the vehicle and at least to a rear of the fixing portion by bending the portion of the opposed sidewall in a direction away from the front end.

A clearance is formed in a vehicle body width direction between the indentation and the front end.

According to an embodiment of the present invention, the body frame includes a down tube extending downwardly in a vehicle-body widthwise center from a head pipe; and the radiator body is disposed in such a manner so as to be split into a pair of left and right halves in a position where the left and right halves sandwich the down tube therebetween in the vehicle width direction.

According to an embodiment of the present invention, the fins and the bracket are directly fixed to each other.

According to an embodiment of the present invention, the fixing portion on the leading end of the extension portion is formed in a plate shape including the mounting hole; the mounting hole is provided with an elastic member clamping a peripheral edge of the mounting hole from both sides in a thickness direction of the extension portion and including a through-hole allowing a fastening screw to pass therethrough; and the mounting portion of the body frame and the fixing portion are fastened to each other through the elastic member.

According to an embodiment of the present invention, the radiator body is disposed forward of an engine; the radiator body is covered with a shroud from outside in the vehicle width direction; and the shroud and the radiator body are coupled to each other.

According to an embodiment of the present invention, the extension portion including the indentation is a plurality provided on the bracket.

According to an embodiment of the present invention, although, if the front end is fixed to the opposed sidewall, the stress is likely to be concentrated on the front end with the indentation being provided so that the front end and the opposed sidewall corresponding to the extension portion are spaced apart. Thus, the area on which stress is likely to be concentrated can be eliminated. Moreover, the bent shape of the indentation allows an increase in the rigidity of the bracket. In addition, the clearance is formed by the structure of the slight indentation which is limited to the base of the extension portion. Therefore, no upsizing in the vehicle width direction nor weight increase of the radiator supporting structure is caused.

According to an embodiment of the present invention, since the radiator body can be fixed to the down tube having high stiffness of the body frame, the radiator body can be securely held. Also, the radiator body is disposed in such a manner so as to be split into the left and right with respect to the vehicle widthwise center. Thus, the left-right weight balance of the vehicle can be favorably maintained.

According to an embodiment of the present invention, the fins of the core and the bracket are directly fixed to each other, thereby allowing savings in space for the fixing structure of the radiator body and easily obtaining the clearance. In addition, it is only necessary to set an actual size at the time of setting the size of the clearance. Therefore, the clearance size control is facilitated.

According to an embodiment of the present invention, the elastic member is provided between the extension portion and the fixing portion of the body frame. Thus, it is possible to exert a cushioning effect with the elastic member between the body frame and the radiator body to absorb vehicle vibration or shock.

According to an embodiment of the present invention, the shroud and the radiator body are coupled to each other. Thus, when an external force acts on the shroud, the radiator body fixing the shroud is subjected to the external force. However, the fixed portion to the frame is provided with the clearance formed of the indentation, thereby enabling an avoidance of stress concentration.

According to an embodiment of the present invention, the plurality of extension portions including the indentations are separately provided, thereby allowing more effective stress dispersion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
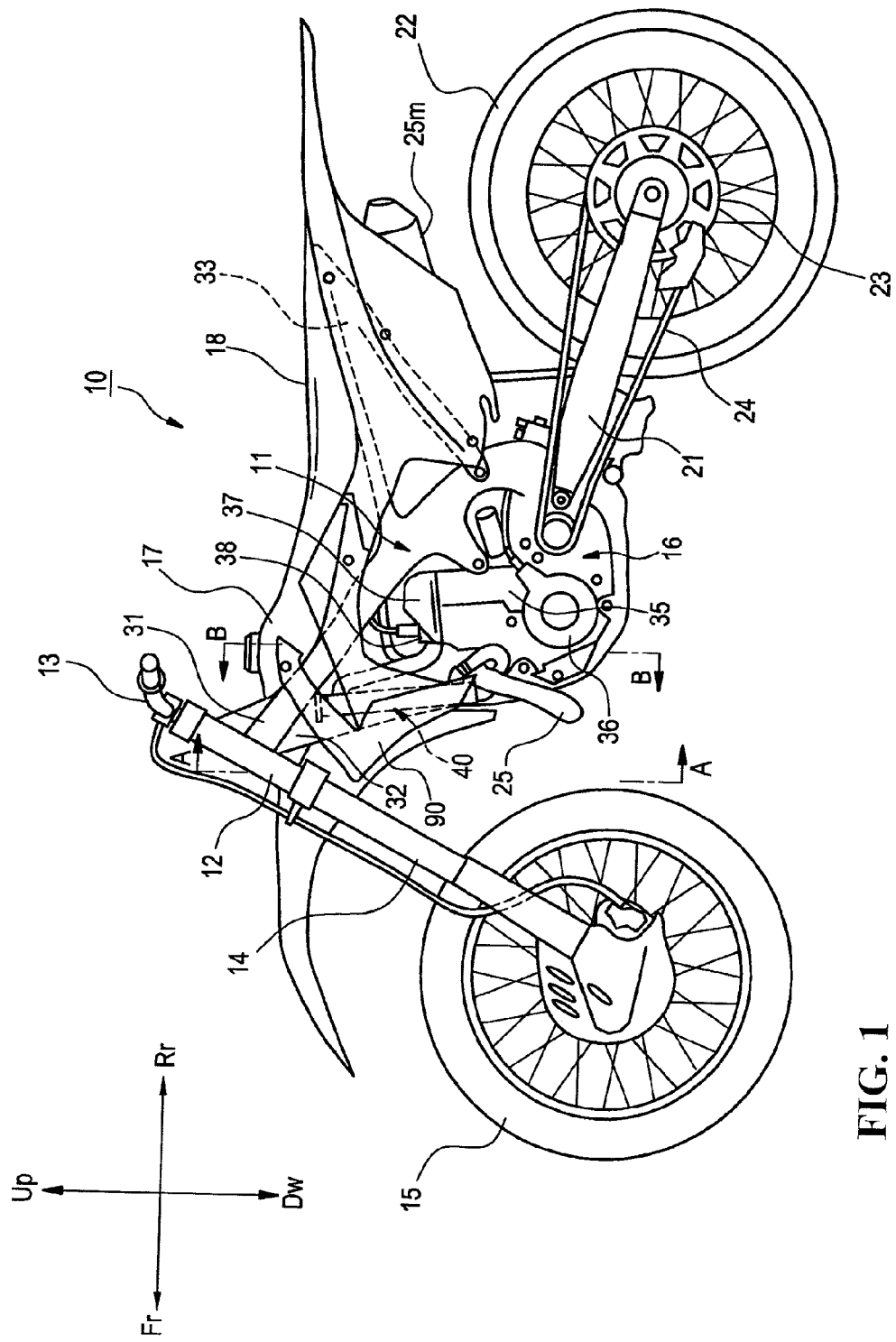
FIG. 1 is a left side view of a motorcycle according to a first embodiment of the present invention.

Hereinafter, embodiments of the present invention will be described.

A first embodiment of the present invention will be described in detail with reference to FIGS. 1 to 12 illustrating a motorcycle serving as a saddle-ride type vehicle according to this embodiment.

It is to be noted that the accompanying drawings should be viewed in the direction of reference signs. In addition, references to directions in the following description are made with reference to a rider. In the drawings, "Fr" denotes a front, "Rr" rear, "L" left, "R" right, "Up" upward direction, and "Dw" downward direction. It is also to be noted that, in the following description and the drawings, the last letter of the reference signs, "L" or "R", represents the left or right hand, respectively.

FIG. 1 is a left side view of a motorcycle 10 according to the present invention. The motorcycle 10 includes a body frame 11; a handlebar 13 and a front fork 14 steerably attached to a head pipe 12 on a front end of the body frame 11; a front wheel 15 attached to the front fork 14; an engine 16 disposed at a central lower portion of the body frame 11; a fuel tank 17 and a seat 18 disposed at an upper portion of the body frame 11. A swing arm 21 extends in a vertically movable manner from a central lower portion of the body frame 11 with a rear wheel 22 attached to a rear portion of the swing arm 21. A rear sprocket 23 is attached to the rear wheel 22 with a chain 24 for transmitting driving force to the rear sprocket 23 being attached thereto.

The body frame 11 is composed of the head pipe 12 with a pair of left and right main frames 31 extending rearwardly from the head pipe 12 and a single down tube 32 hanging down from the head pipe 12 and extending rearwardly. A pair of left and right seat rails 33 extend rearwardly from rear portions of the main frames 31, and the like.

The engine 16 is a two-cycle water-cooled engine and has a cylinder block 35 with a crankcase 36 attached below the cylinder block 35 and a cylinder head 37 attached above the cylinder block 35. A thermostat cap 38 is attached to the cylinder head 37 with a water pump 39 (see FIG. 2) provided at, for example, a right lower portion of the crankcase 36.

Figure 11:
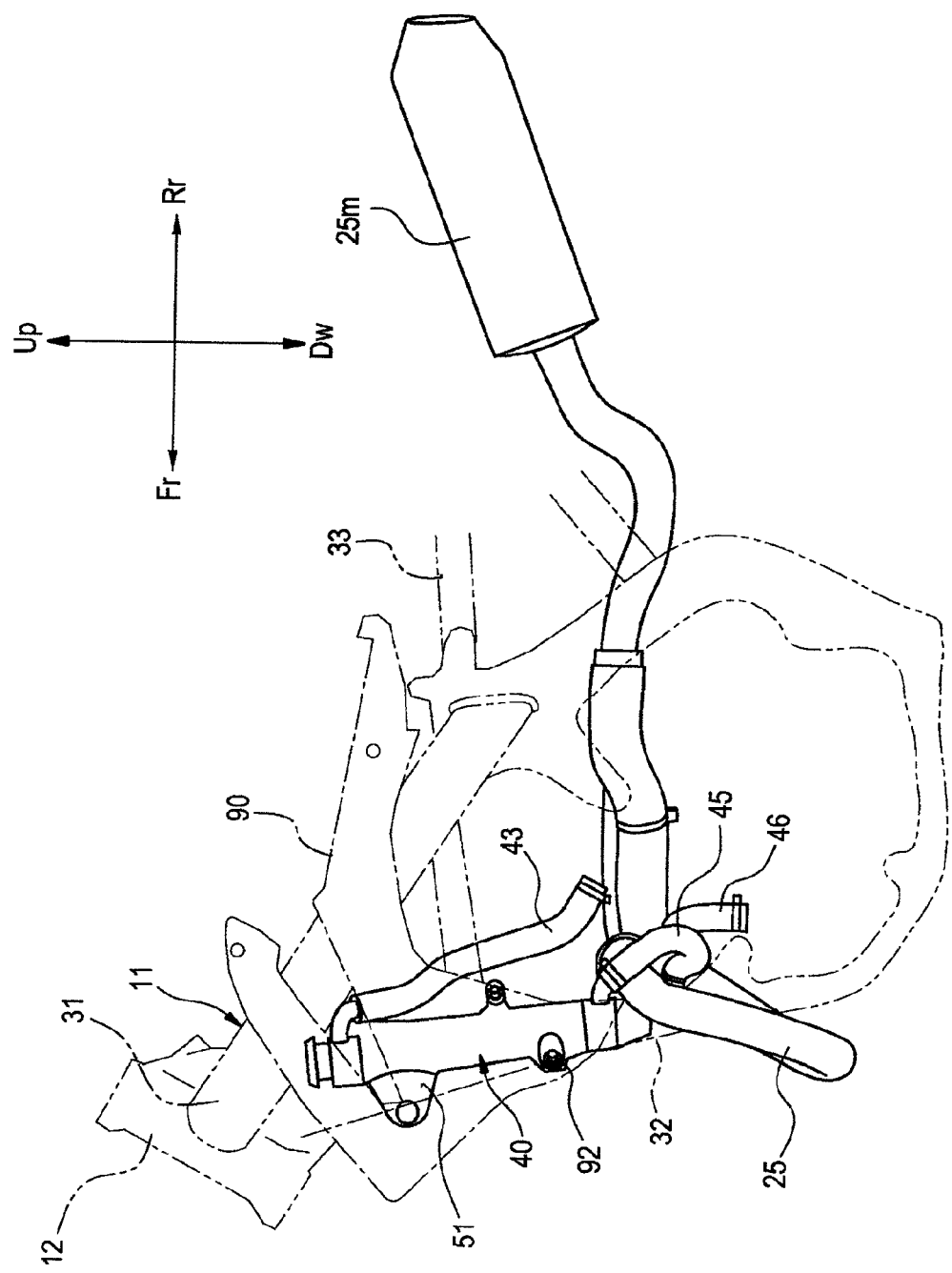
FIG. 11 is a schematic side view of the essential parts, for illustrating layout of the radiator body, a body frame, and an exhaust pipe according to the present invention.

Furthermore, a radiator body 40 is a heat exchanger that is disposed forward of the cylinder head 37 of the engine 16 to cool the engine 16. As shown in FIG. 11, the radiator body 40 is fixed along the down tube 32.

Figure 2:
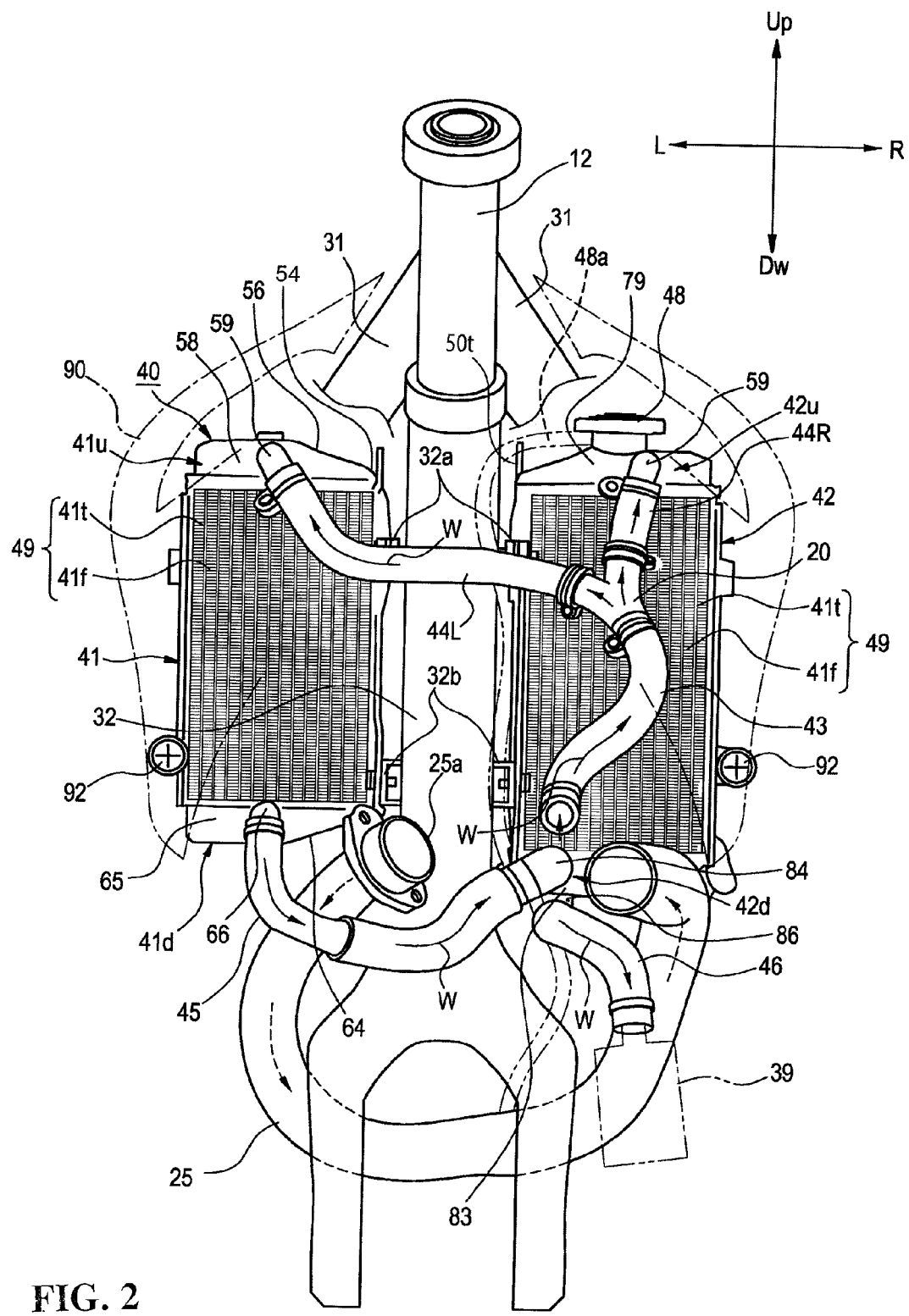
FIG. 2 is a sectional view taken along arrowed line B-B of FIG. 1.
Figure 3:
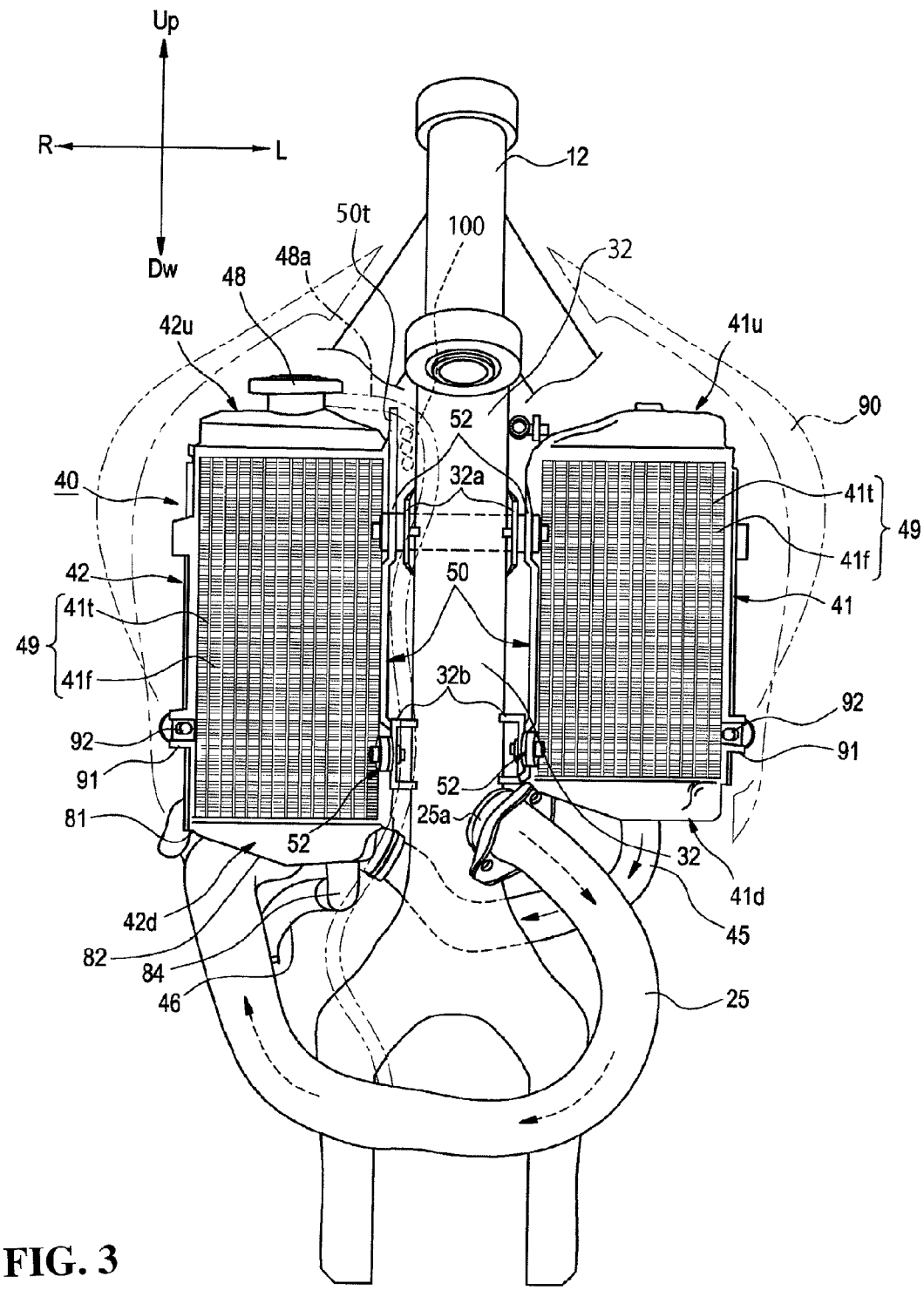
FIG. 3 is a sectional view taken along arrowed line A-A of FIG. 1.
Figure 4:
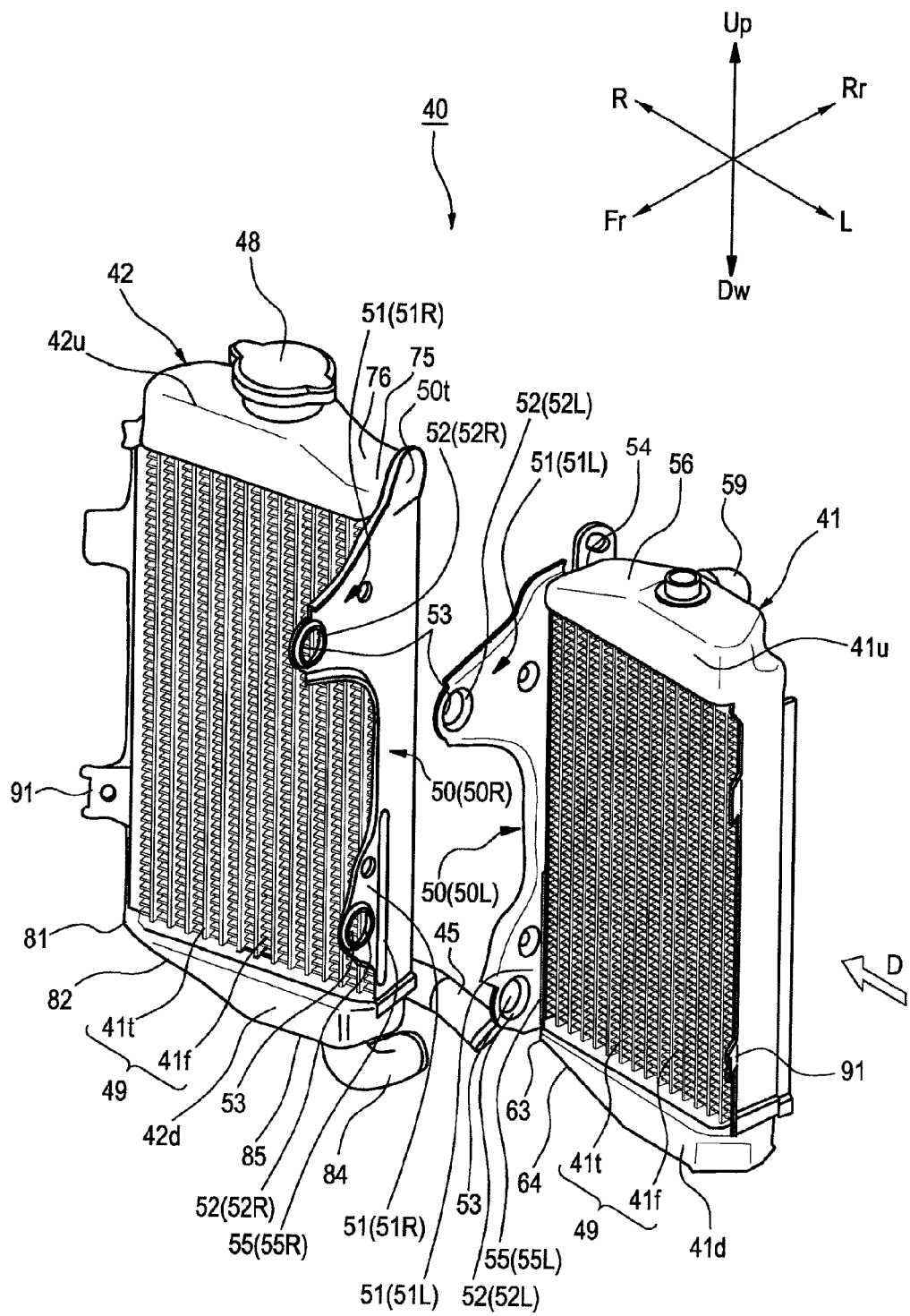
FIG. 4 is a perspective view of a radiator body in an installed position on a vehicle body according to the first embodiment of the present invention, viewed from the diagonally forward left of the vehicle body.
Figure 5:
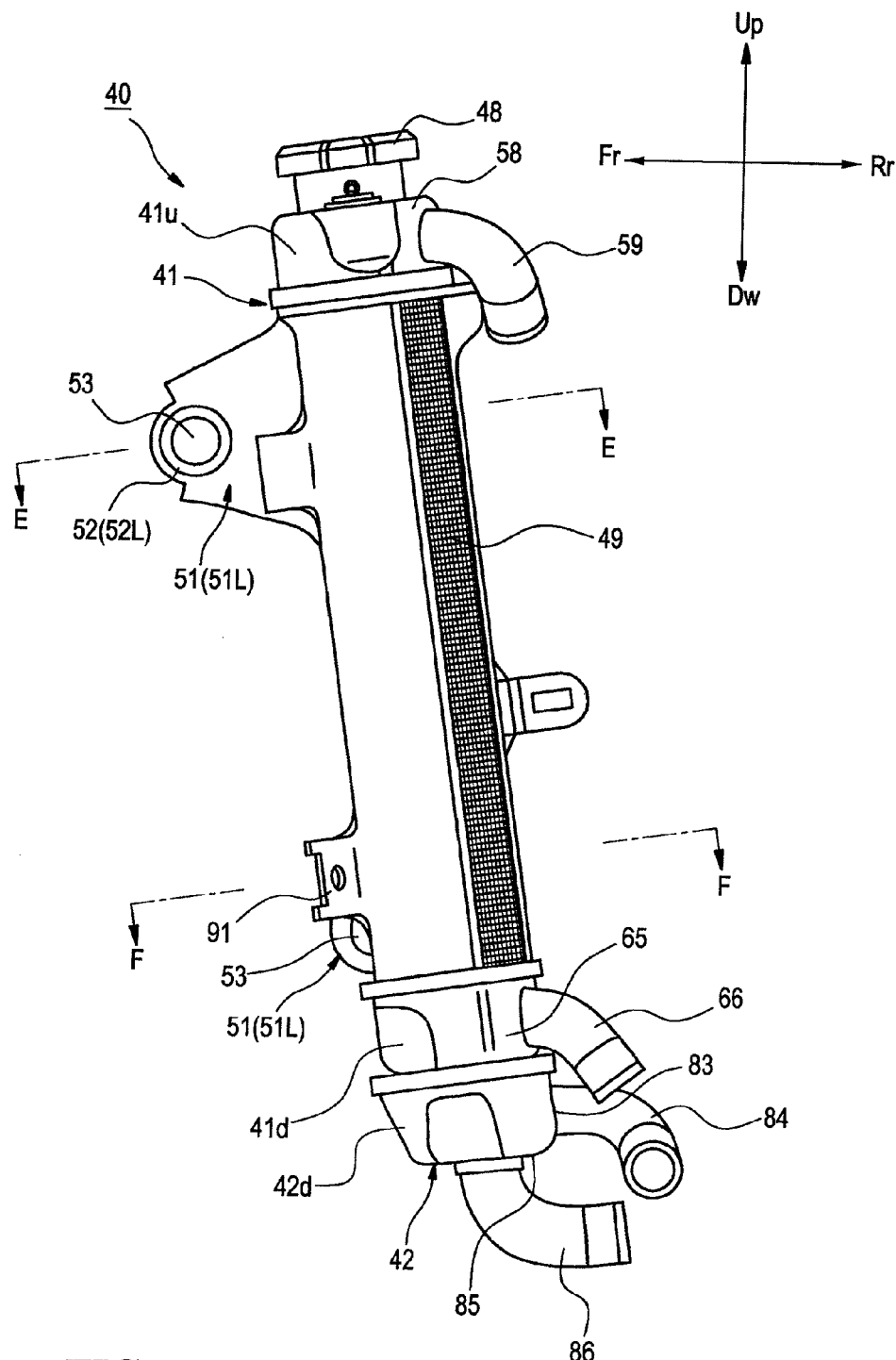
FIG. 5 is a side view taken in a direction of arrow D of FIG. 4.

The radiator body 40 of this embodiment will be described in detail with reference to FIGS. 2 to 5. It is to be noted that: FIG. 2 is a sectional view taken along arrowed line B-B of FIG. 1, showing the radiator body 40 viewed from the rear of the vehicle; and FIG. 3 is a sectional view taken along arrowed line A-A of FIG. 1, showing the radiator body 40 viewed from the front of the vehicle. In both drawings, the engine 16 and its surrounding structures are not shown, as appropriate. In addition, FIG. 4 is a perspective view of the radiator body 40 in an installed position on a vehicle body, viewed from the diagonally forward left of the vehicle body. FIG. 5 is a side view taken from the left side in FIG. 4 (taken in a direction of arrow D).

The radiator body 40 is, as shown in FIG. 2, a pair of left and right heat exchangers including a left radiator 41 disposed on the left of the down tube 32 located at the center of the vehicle body and a right radiator 42 disposed on the right of the down tube 32. The left and right radiators 41 and 42 of the radiator body 40, as shown in FIGS. 2 and 3, have brackets 50 (50L, 50R) fixed to mounting portions 32a and 32b of the down tube 32. Also, as shown in FIG. 5, the radiator body 40, on the upper side thereof, is slightly inclined forwardly of the vehicle when viewed from the side of the vehicle. Further, when viewed from above the vehicle, the left and right radiators 41 and 42 are fixed with the outer side thereof slightly inclined forwardly of the vehicle (see FIG. 6).

In this manner, the radiator body 40 of this embodiment is disposed and fixed at a position such that the down tube 32 is sandwiched in between in a vehicle width direction. Therefore, the left and right radiators 41 and 42 are arranged in such a manner as to be split into left and right with respect to the vehicle widthwise center, thereby favorably maintaining the left-right weight balance of the vehicle. Also, it is possible to securely hold the left and right split vertically-elongated radiators 41 and 42 with the down tube 32 having high stiffness.

A piping structure of the radiator body 40, which permits the circulation of cooling water W, will be described.

A first radiator hose 43 (see FIG. 2) is connected to a cooling water outlet (not shown) of the thermostat cap 38. High-temperature cooling water is supplied to the left and right radiators 41 and 42 through two second radiator hoses 44 (44L, 44R) formed by splitting the first radiator hose 43. Furthermore, the radiator body 40 includes a third radiator hose 45 that allows low-temperature cooling water to circulate from a lower portion of the left radiator 41 to the right radiator 42; a fourth radiator hose 46 that allows low-temperature cooling water to circulate from a lower portion of the right radiator 42 to the water pump 39; and a siphon tube 48a provided at an upper portion of the right radiator 42.

Also, as shown in FIGS. 2 and 3, the exhaust pipe 25 is installed below the radiator body 40 and has a connecting end 25a connected to an exhaust port (not shown) of the engine 16. The exhaust pipe 25 is extends leftward and forward, and downwardly of the engine 16 from the connecting end 25a, and furthermore is bent to the right from below the down tube 32, and then extends rearward of the vehicle body to extend to a muffler 25m (see FIG. 11).

The structures of the left and right radiators 41 and 42 will be described in more detail.

In FIG. 4, the left radiator 41 has a vertically elongated shape and is composed of an upper tank 41u provided at an upper portion thereof, a core 49 provided at a central portion, the lower tank 41d provided at a lower portion, and the bracket 50 (50L). Furthermore, the upper tank 41u is provided with an upper recess 56 in an upper corner 54 toward the center of the vehicle body and has an inlet pipe joint 59 attached to a rear surface 58 (see FIGS. 2 and 5). The upper tank 41u guides the cooling water W to the core 49.

Figure 6:
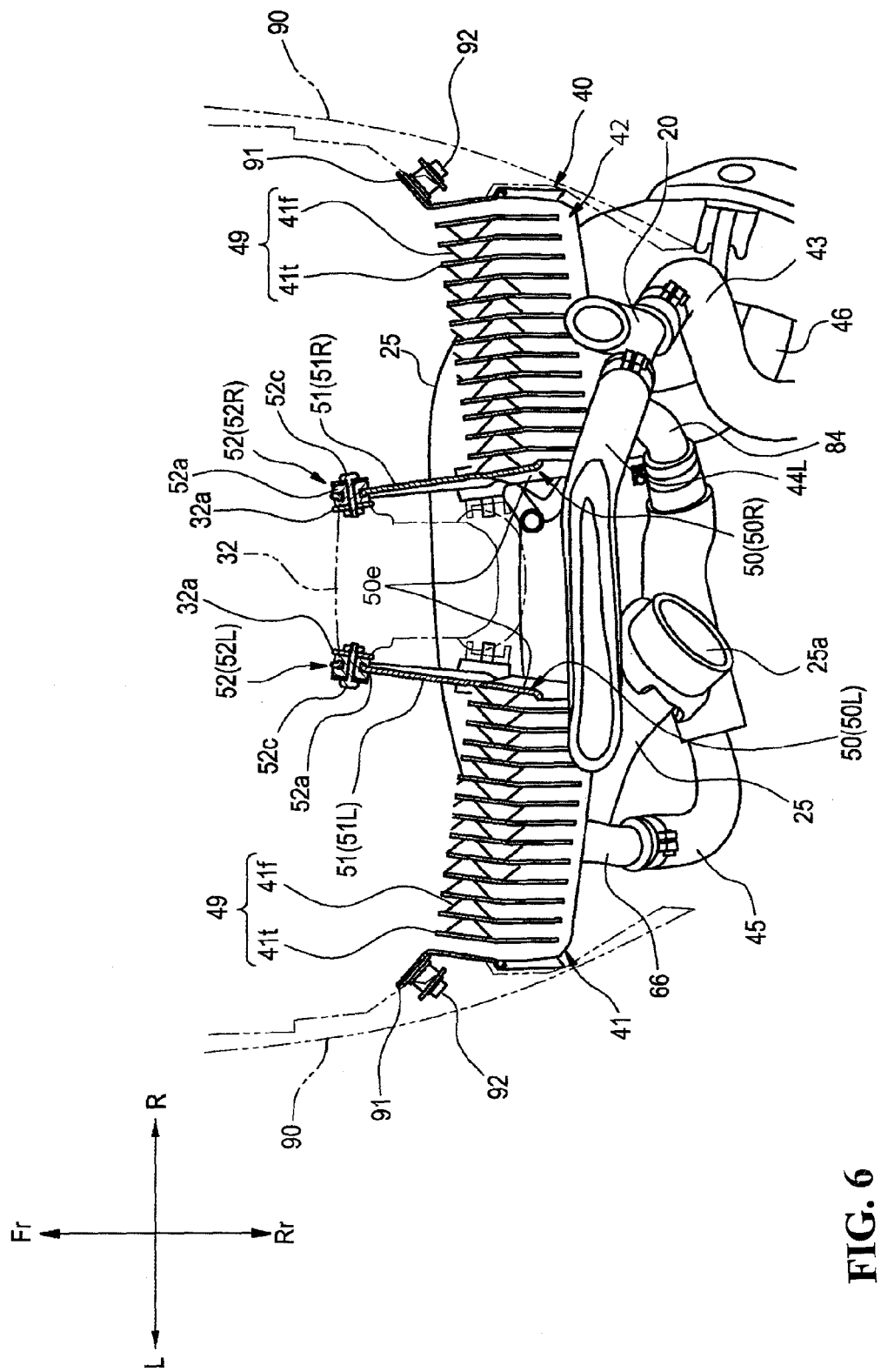
FIG. 6 is a sectional view taken along arrowed line E-E of FIG. 5.
Figure 7:
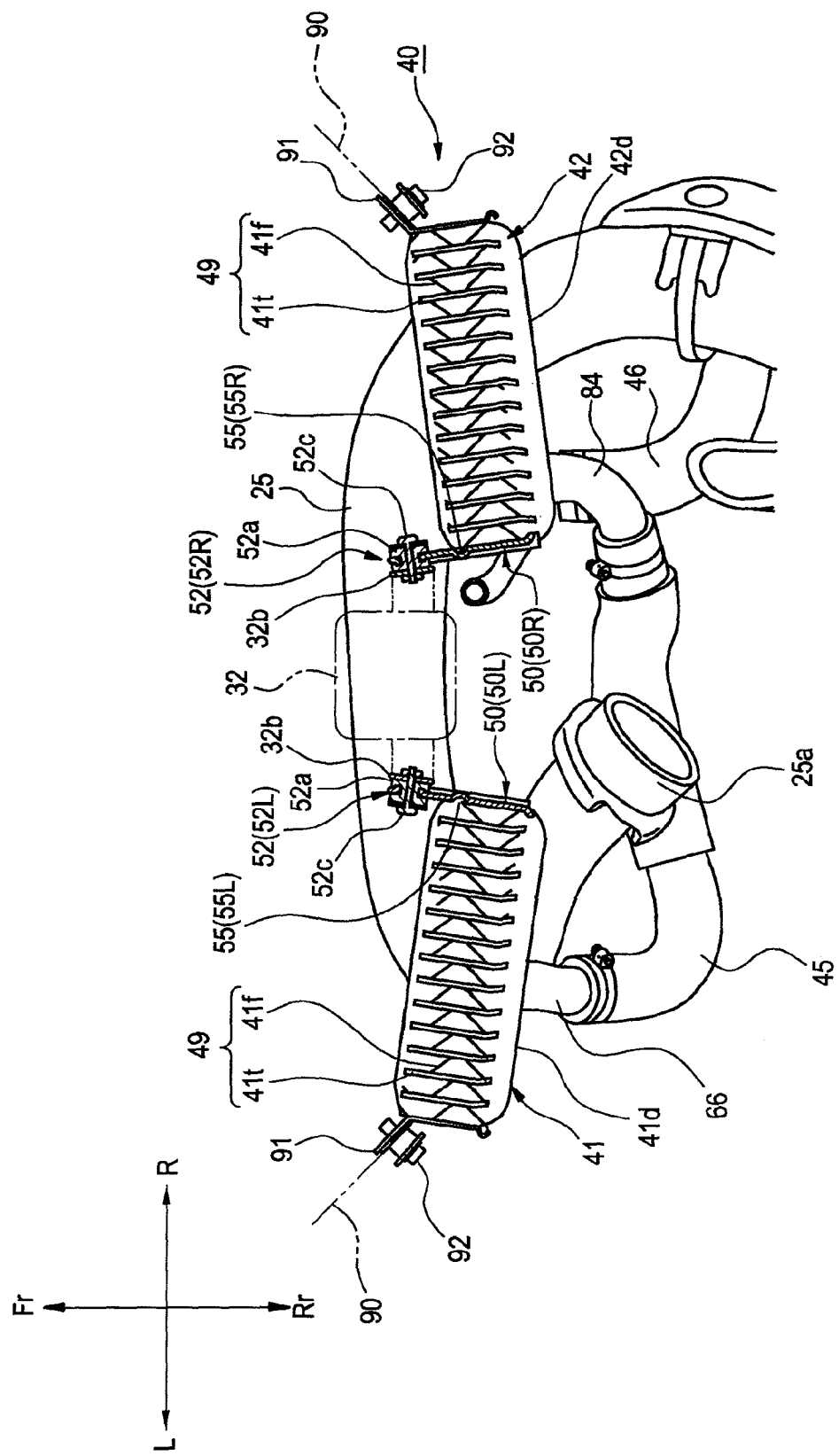
FIG. 7 is a sectional view taken along arrowed line F-F of FIG. 5.

As shown in section in FIGS. 6 and 7, the core 49 is composed of a plurality of plate tubes 41t allowing passage of the cooling water W, and a plurality of fins 41f of corrugated shape in cross-section provided in contact with the tubes 41t. Also, the tubes 41t communicate with the upper tank 41u and the lower tank 41d, thereby allowing the effective cooling of the cooling water W passing through the tubes 41t. Furthermore, the lower tank 41d disposed at the lower portion of the core 49 has a construction in which a lower recess 64 is provided in an outer lower corner 63 (see FIG. 4) and an outlet pipe joint 66 is attached to a rear surface 65 (see FIGS. 2 and 5). The lower tank 41d guides the cooling water W to the lower tank 42d of the right radiator 42.

On the other hand, the right radiator 42 has a vertically elongated shape and is composed of an upper tank 42u provided at an upper portion thereof, the core 49 provided at a central portion, the lower tank 42d provided at a lower portion, and the bracket 50R. The right radiator 42 is slightly increased in length relative to the left radiator 41. Furthermore, the upper tank 42u is provided with an upper recess 76 in an upper corner 75 toward the center of the vehicle body and has the inlet pipe joint 59 attached to a rear surface 79 (see FIG. 2), thereby enabling the guiding of the cooling water W to the core 49.

In the same manner as the core 49 of the above-described left radiator 41, as shown in FIGS. 6 and 7, the core 49 is composed of the plurality of tubes 41t allowing passage of the cooling water W, and the plurality of fins 41f of corrugated shape in cross-section provided between the tubes 41t.

Furthermore, the lower tank 42d is provided with a lower recess 82 in an outer lower corner 81 and has a lower pipe joint 84 attached to a rear surface 83 (see FIGS. 2 and 5) and an outlet pipe joint 86 attached to a lower surface 85 (see FIG. 5). The lower tank 42d is constructed to guide the cooling water W to an outlet through the outlet pipe joint 86.

It is to be noted that, although not shown in the drawings, the front surfaces of the left and right cores 49 are each provided with a louver structure that guides airflow to the cores 49 while the vehicle is operated.

Next, the cooling water route will be described.

When the cooling water W reaches a predetermined temperature, a thermostat within the thermostat cap 38 is opened and the cooling water W flows into the upper tank 41u of the left radiator 41 and the upper tank 42u of the right radiator 42 from the cooling water outlet through the first radiator hose 43, a branch pipe 20, and the second radiator hoses 44L and 44R, and then flows downwardly from the left and right cores 49 into the lower tank 41d and the lower tank 42d. Here, the cooling water W in the lower tank 41d flows through the third radiator hose 45 into the lower tank 42d. The cooling water W in the lower tank 42d flows through the fourth radiator hose 46 into the water pump 39. Then the cooled cooling water W is supplied again to the engine 16 and circulates.

The brackets 50 (50L, 50R) of this embodiment will be described in detail with reference to FIGS. 8 to 10.

Figure 8:
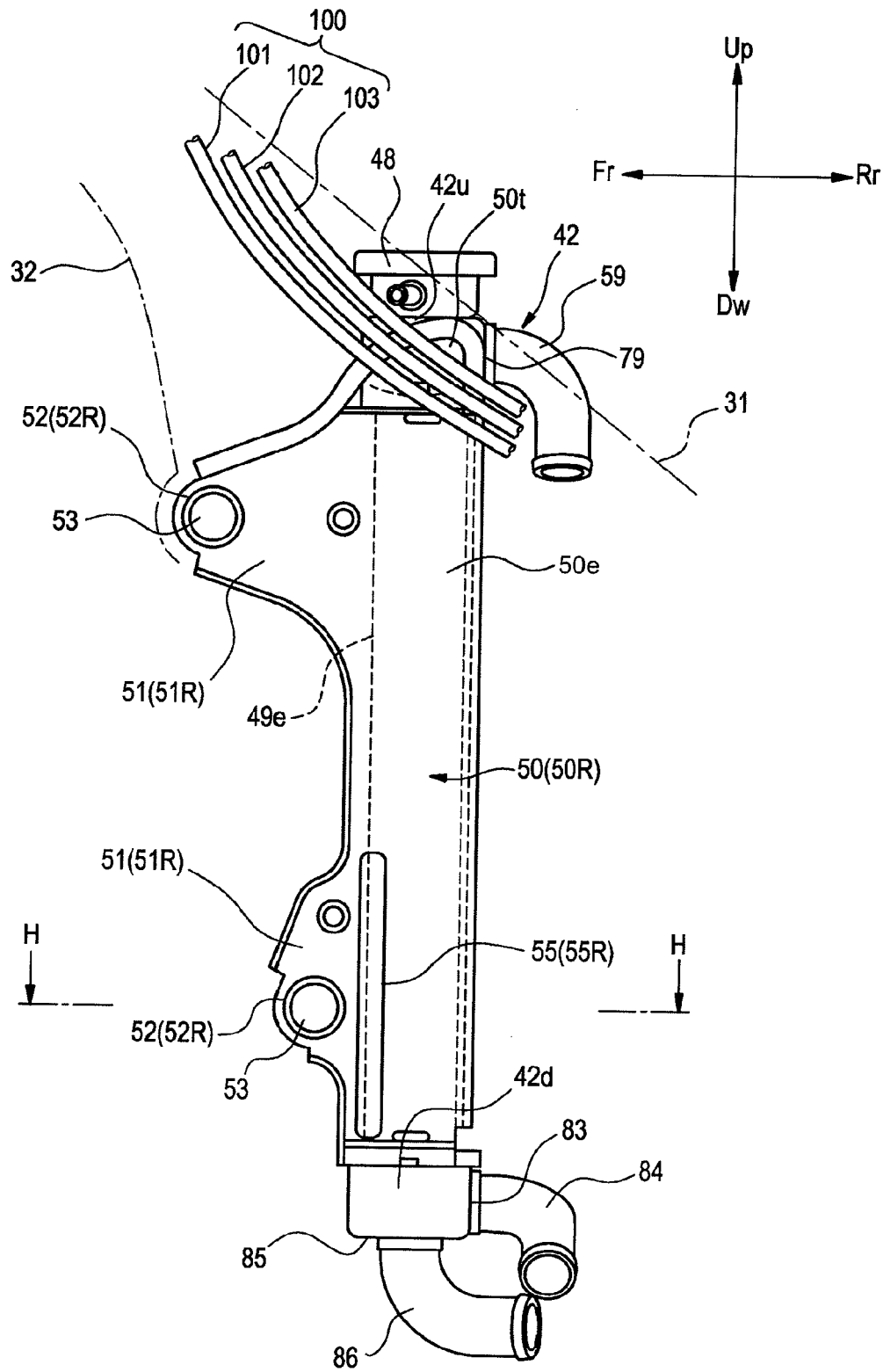
FIG. 8 is a side view of a right radiator of the radiator body according to the first embodiment of the present invention, viewed from inside the vehicle.
Figure 9:
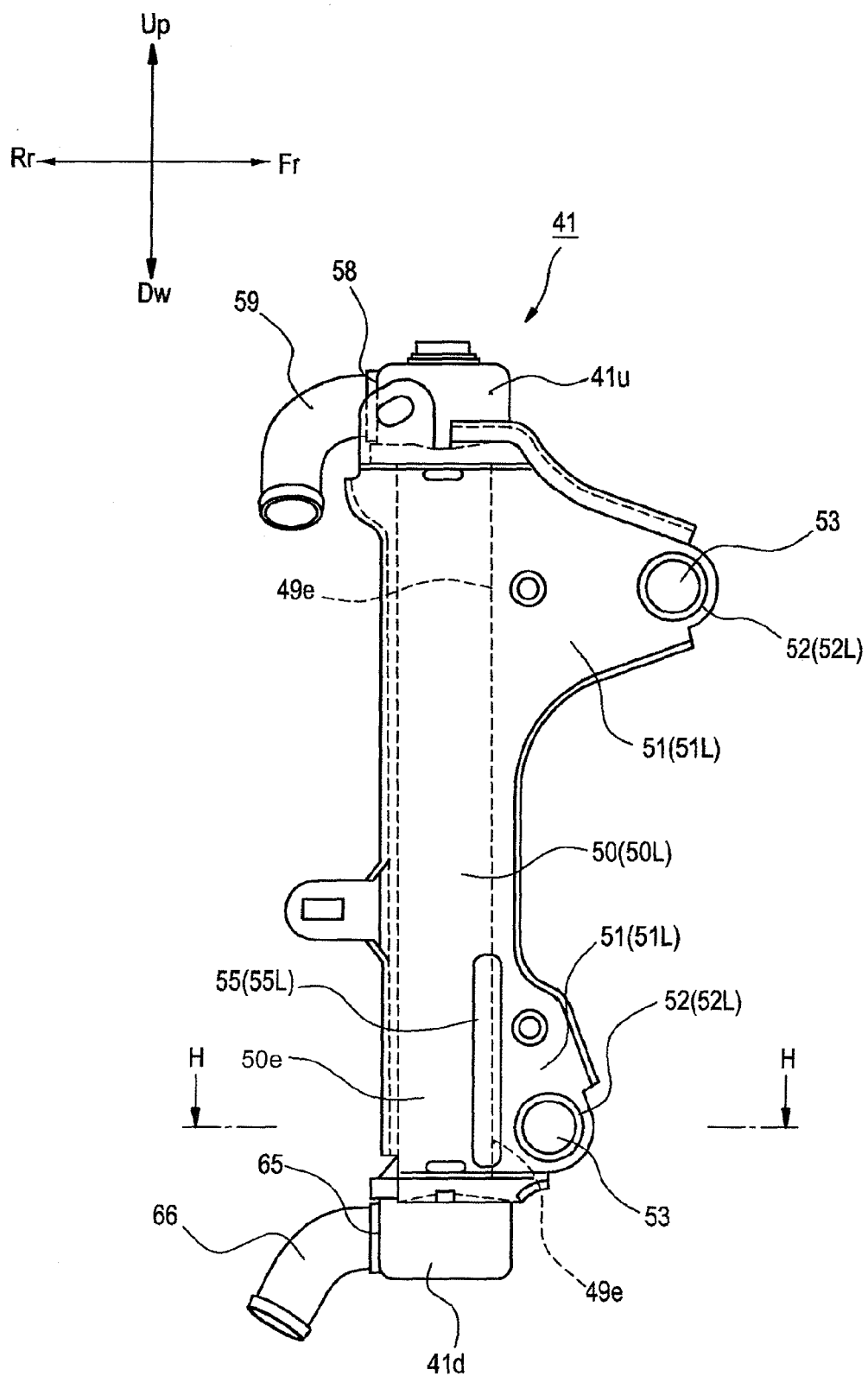
FIG. 9 is a side view of a left radiator of the radiator body according to the first embodiment of the present invention, viewed from inside the vehicle.

The brackets 50 (50L, 50R) of this embodiment are disposed, as shown in FIGS. 8 and 9, inside of the left and right cores 49 in the vehicle width direction. Each of the brackets 50 (50L, 50R) is provided with an extension portion 51 (51L, 51R) extending in a vehicle front-rear direction (in this embodiment, forward of the vehicle). The extension portion 51 (51L, 51R) is formed so that its vertical width decreases gradually toward an extended leading end thereof (forward of the vehicle) in side view. Further, a fixing portion 52 (52L, 52R) with a mounting hole 53 is provided on the extended leading end.

The fixing portion 52 (52L, 52R) is fixed to the down tube 32 of the body frame 11. Furthermore, the extension portion 51 (51L, 51R) is provided at a plurality of portions (in this embodiment, two portions) in the vertical direction of the bracket 50 (50L, 50R). The extension portions 51 (51L, 51R) are constructed such that the extension portion 51 (51L, 51R) located on the upper side has a greater extension length.

In this manner, the plurality of extension portions 51 (51L, 51R) have different extension lengths in the vehicle vertical direction, thereby allowing adjustable setting of the position and direction in which the radiator body 40 is fixed to the body frame 11.

In this embodiment, an indentation 55 (55L, 55R) is formed along a bracket longitudinal direction in a base of the lower of the two upper and lower extension portions 51 (51L, 51R). The indentation 55 (55L, 55R) has an indented shape to avoid each of the cores 49 (see FIGS. 9 and 10) when viewed from the side on which the core is located. In other words, the indentation 55 (55L, 55R) is located at least toward the vehicle front or rear (in this embodiment, toward the rear) with respect to the fixing portion 52 (52L, 52R) and provided in the opposed sidewall 50e that overlaps a front end 49e of each of the cores 49 when the vehicle is viewed from the side (in the direction shown in FIGS. 8 and 9). Thus, the indentation 55 (55L, 55R), as shown in FIG. 10, has a structure with the opposed sidewall 50e bent in a direction away from the front end 49e. A clearance 2 is formed between the opposed sidewall 50e and the front end 49e.

Furthermore, in this embodiment, in each of the brackets 50 (50L, 50R), the opposed sidewall 50e is directly fixed by brazing to the fins 41f of each of the cores 49. In this manner, the bracket 50 (50L, 50R) is directly fixed to the fins 41f of each of the cores 49, thereby allowing a savings in space for the fixing structure of the radiator body 40. It is therefore possible to not only easily obtain the clearance 2, but also to easily set the size of the clearance 2.

Figure 10:
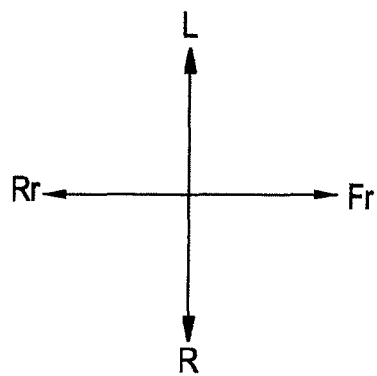
FIG. 10 is a sectional view taken along arrowed line H-H of FIG. 9.
Figure 10:
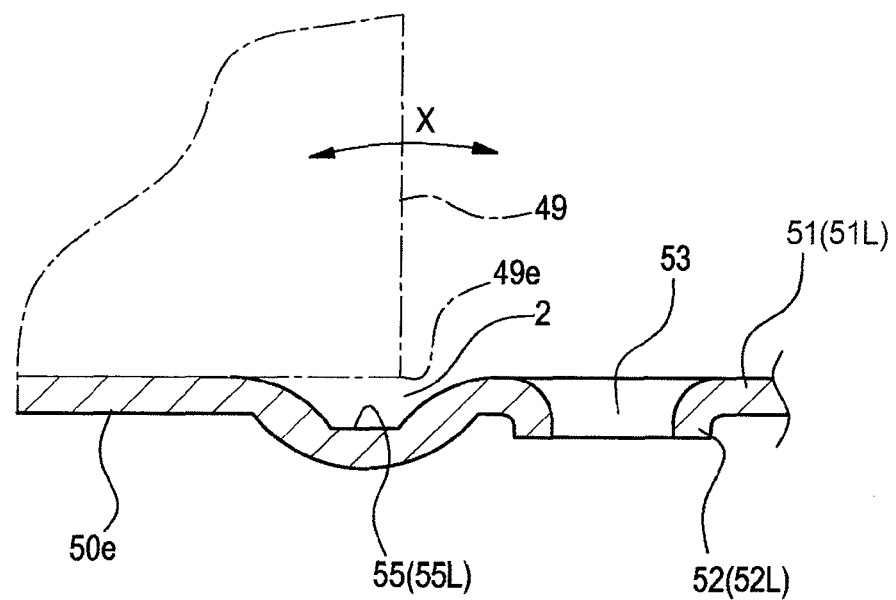

In addition, since the fins 41f are relatively flexible members, when vehicle vibration occurs, as shown in FIG. 10, the cores 49 are likely to swing on the vehicle outer side with respect to the brackets 50 (50L, 50R) (for example, a motion in the direction of arrow X).

In this case, if the front end 49e is fixed to the opposed sidewall 50e, the stress is likely to be concentrated on the front end 49e, while, in this embodiment, the indentation 55 (55L, 55R) is provided so that the front end 49e and the opposed sidewall 50e corresponding to the extension portion 51 (51L, 51R) are spaced apart. Thus, the area on which stress is likely to be concentrated can be eliminated.

Moreover, the bent shape of the indentation 55 (55L, 55R) allows an increase in the rigidity of the bracket 50 (50L, 50R). Also, the indentation 55 (55L, 55R) forms the clearance 2 between the opposed sidewall 50e and the front end 49e, and thus the load on the front end 49e due to contact can be avoided. In addition, the clearance 2 of this embodiment is formed by the structure of the slight indentation 55 (55L, 55R) that is limited to the base of the extension portion 51 (51L, 51R). Therefore, no upsizing in the vehicle width direction nor weight increase of the radiator supporting structure is caused.

In this embodiment, as shown in FIG. 8, the bracket 50R of the right radiator 42 is formed, at an upper end thereof, with a protruding angular portion 50t of triangular shape in side view. The uppermost end of the protruding angular portion 50t extends to an elevation of the upper end of the upper tank 42u. Also, cables 100, such as a throttle return cable 101, a throttle cable 102, and a clutch cable 103, passing rightward of the main frame 31, are arranged so as to pass between the bracket 50R and the down tube 32 in the vehicle width direction (see FIG. 3).

As described above, the upper end of the bracket 50R extends to form the protruding angular portion 50t, thereby allowing the positioning of the cables 100 in the space formed by the bracket 50R and the down tube 32. Thus, the bracket 50R also functions as a guard member that prevents the cables 100 from being displaced outward in the vehicle width direction.

Figure 12:
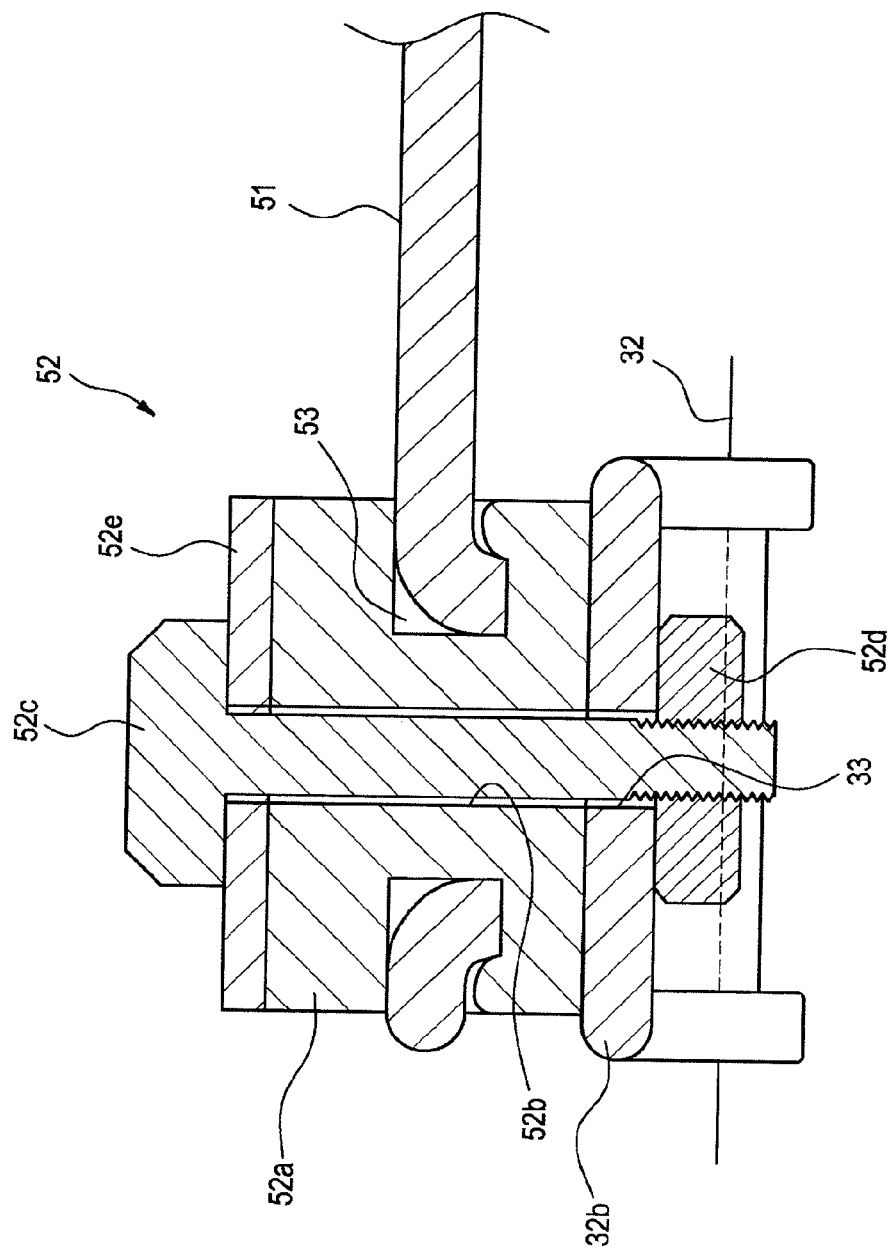
FIG. 12 is a sectional view of the essential parts, showing the fixing structure of the radiator body according to the first embodiment of the present invention.

The fixing structure of the radiator body 40 of this embodiment will be described with reference to FIG. 12.

The left and right radiators 41 and 42 of the radiator body 40, on the vehicle widthwise inner side thereof, have a structure in which the fixing portions 52 (52L, 52R) of the extension portions 51 (51L, 51R) are fastened to the four mounting portions 32a and 32b of the down tube 32 as described above.

For this fixation of the extension portions 51 (51L, 51R), an elastic member 52a having a through-hole 52b is previously fitted within each of the mounting holes 53. Then with the through-hole 52b aligned with a hole 33b of the corresponding mounting portion 32b, a fastening screw 52c passed through a presser plate 52e is inserted into the through-hole 52b, mounted with a nut 52d, and fastened and fixed. This fixing structure applies to all four portions.

It should be noted that, for fastening and fixing of the fastening screw 52c, the nut 52d is no more required if the hole 33b of the mounting portion 32b is formed with internal threads.

In this manner, the elastic member 52a is provided at the fastening portions between the extension portions 51 (51L, 51R) and the down tube 32 of the body frame 11. Thus, it is possible to exert the cushioning effect between the body frame 11 and the radiator body 40 and effectively absorb vehicle vibration or shock.

Furthermore, the left and right radiators 41 and 42 are covered, from the vehicle widthwise outside, with shrouds 90 fixed to the vehicle body as appropriate (see FIGS. 1 and 11). Also, the shrouds 90 and the left and right radiators 41 and 42 are fixed to each other by threading fastening screws 92 into outer fixing portions 91 of the left and right radiators 41 and 42.

As described above, in the case where the left and right radiators 41 and 42 are coupled to the shrouds 90, when external force acts on the shrouds 90, the left and right radiators 41 and 42 fixing the shrouds 90 are subjected to the external force. However, each of the brackets 50 (50L, 50R) is provided with the indentation 55 (55L, 55R), and the clearance 2 is formed, thereby allowing the avoidance of stress concentration on the front end 49e on which the stress has been likely to be concentrated in the related art.

Hereinafter, a second embodiment of the present invention will be described.

The second embodiment of the present invention will be described with reference to FIGS. 13 to 16.

Figure 13:
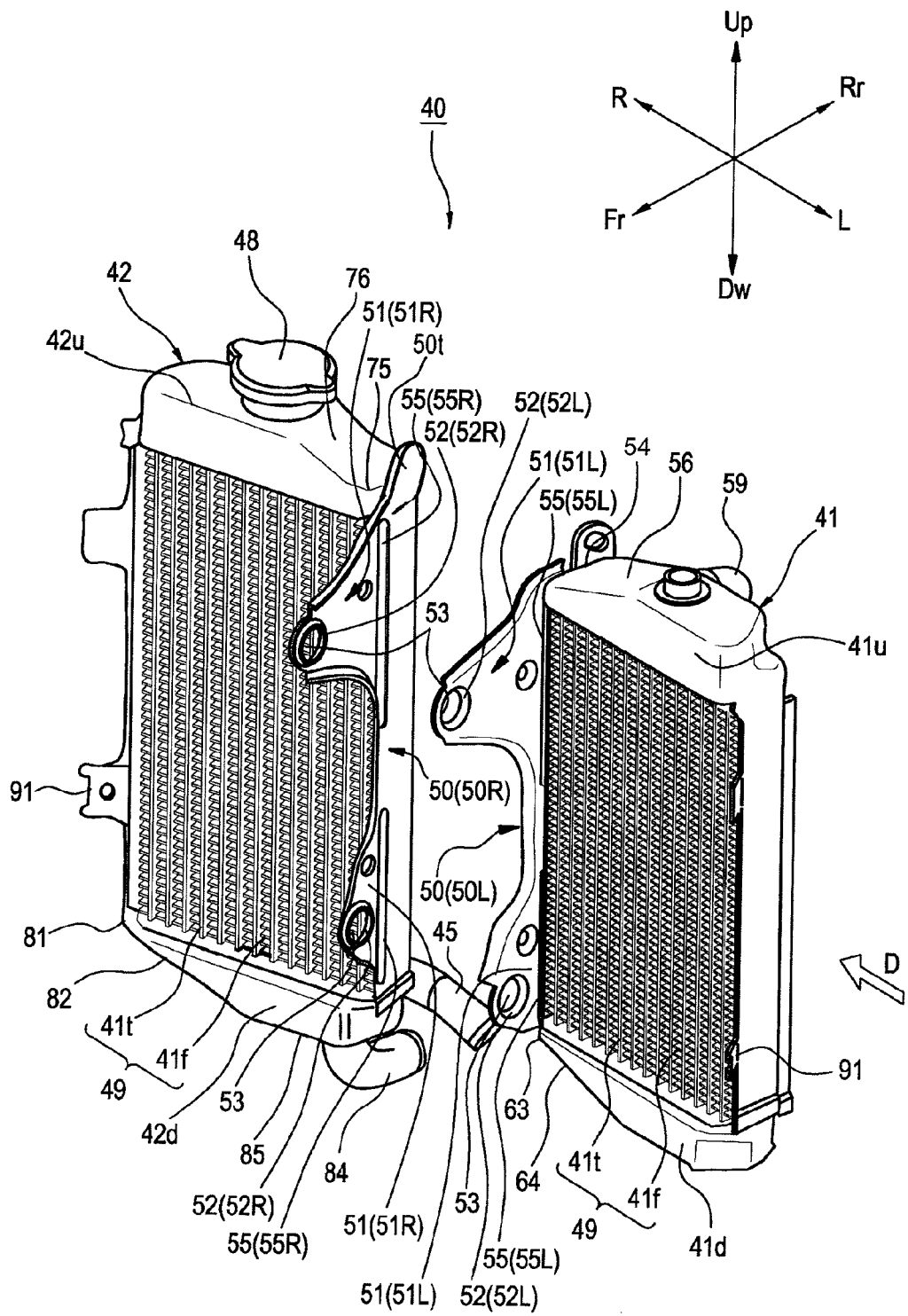
FIG. 13 is a perspective view of a radiator body according to a second embodiment of the present invention, viewed from the diagonally forward left of the vehicle body.
Figure 14:
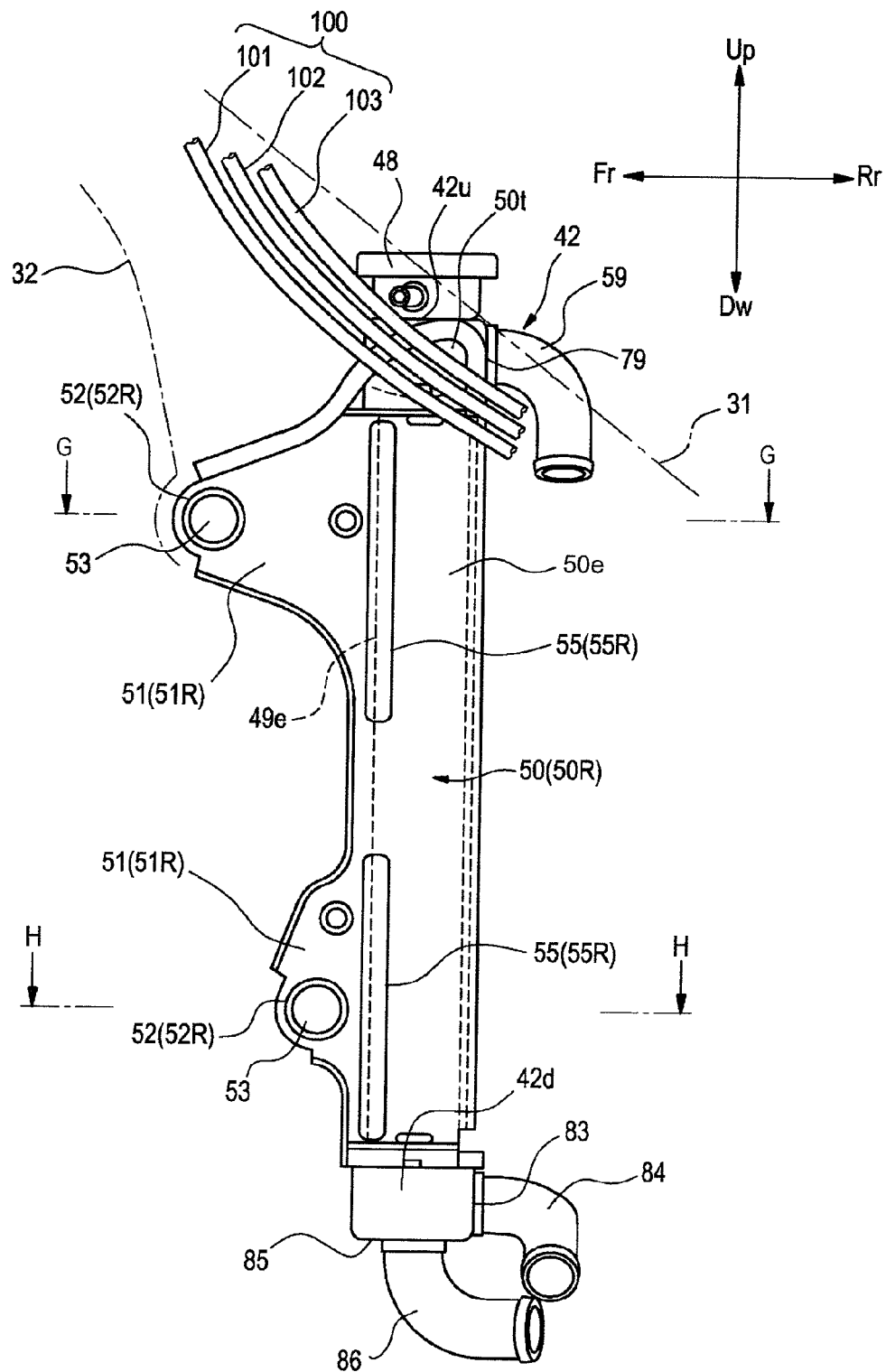
FIG. 14 is a side view of a right radiator of the radiator body according to the second embodiment of the present invention, viewed from inside the vehicle.
Figure 15:
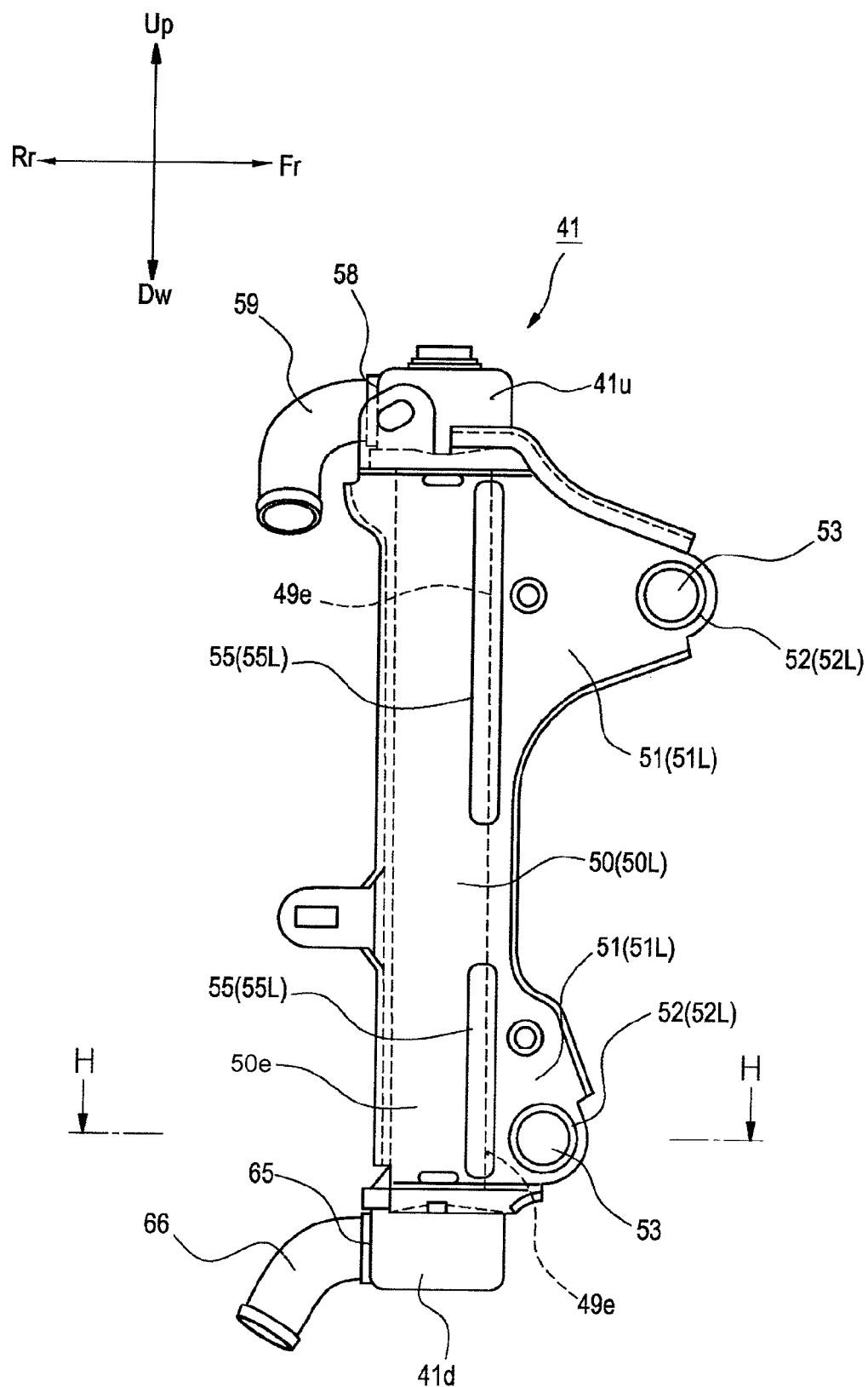
FIG. 15 is a side view of a left radiator of the radiator body according to the second embodiment of the present invention, viewed from inside the vehicle.
Figure 16:
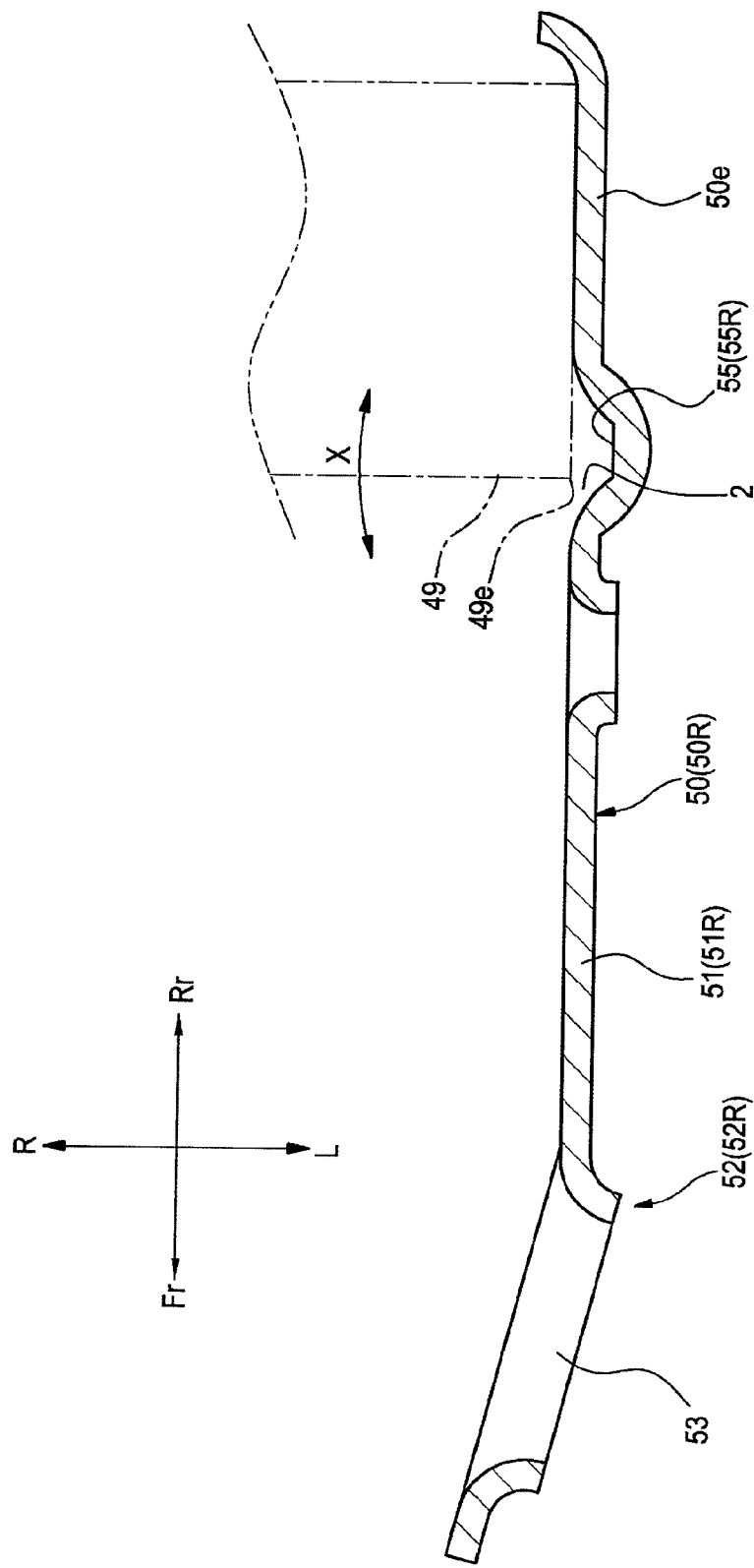
FIG. 16 is a sectional view taken along arrowed line G-G of FIG. 14.

In FIGS. 13 to 16 shown in the second embodiment, the same elements as the first embodiment are denoted by the same reference signs, and the description thereof will not be repeated. Also, the elements not described in the second embodiment are the same as those in the foregoing first embodiment. Note that FIG. 16 is a sectional view taken along arrowed line G-G of FIG. 14. Also, a sectional view taken along arrowed line H-H of FIG. 14 is the same in structure as FIG. 10, and therefore will not be provided.

In a construction of the second embodiment, as shown in FIGS. 13 to 15, the indentation 55 (55L, 55R) provided on each of the brackets 50 (50L, 50R) is provided in the upper extension portion 51 (51L, 51R) in addition to the lower extension portion in the first embodiment.

In this embodiment, the indentations 55 (55L, 55R) are formed along the bracket longitudinal direction in bases of the two upper and lower extension portions 51 (51L, 51R). Each of the indentations 55 (55L, 55R) has an indented shape to avoid each of the cores 49 when viewed from the side on which the core is located. In the same manner as the first embodiment, the indentation 55 (55L, 55R) is located at least toward the vehicle front or rear (in this embodiment, toward the rear) with respect to the fixing portion 52 (52L, 52R) and provided in the opposed sidewall 50e that overlaps the front end 49e of the core 49 when the vehicle is viewed from the side (in the direction shown in FIGS. 14 and 15).

Furthermore, in the sectional view shown in FIG. 16, although the structure is almost the same as that shown in FIG. 10, the extension portion 51 is made larger than that in FIG. 10 and the indentation 55 (55L, 55R) is provided in the base of the extension portion 51. The indentation 55 (55L, 55R) has the structure in which the opposed sidewall 50e is bent in a direction away from the front end 49e and the clearance 2 is formed between the opposed sidewall 50e and the front end 49e.

As described above, in this embodiment, the indentation 55 (55L, 55R) is provided in each of the two extension portions 51 (51L, 51R) vertically provided on the bracket 50 (50L, 50R). Thus, stress can be more effectively dispersed relative to the first embodiment in which the indentation 55 (55L, 55R) is provided in one place.

Figure 17:
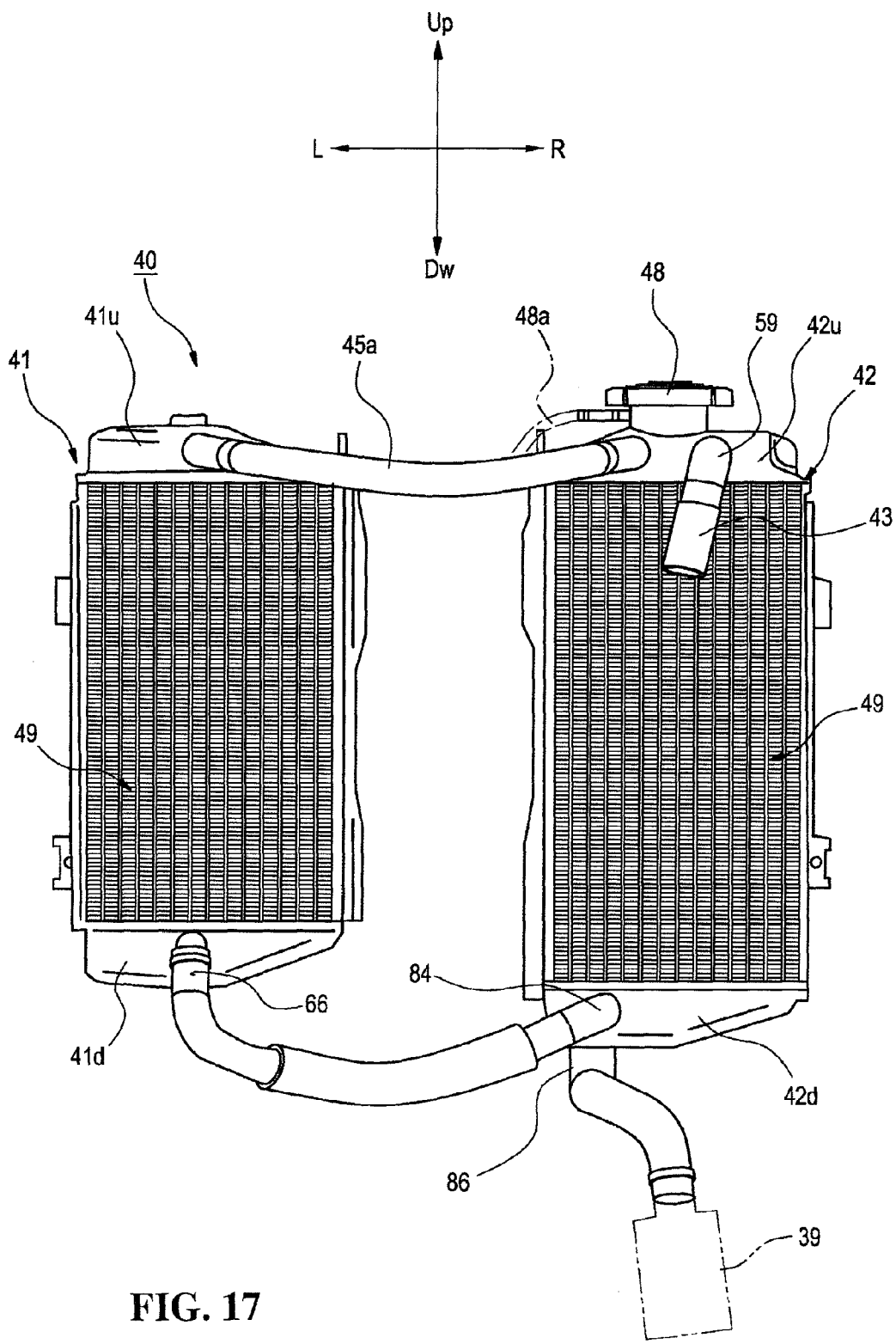
FIG. 17 is a rear view of the radiator body showing essential parts of a modification of the present invention.

Hereinafter, a modification of the foregoing embodiments will be described with reference to FIG. 17.

In the foregoing embodiments, as shown in FIG. 2, the radiator body 40 is constructed in such a manner so as to be split into the left and right radiators 41 and 42 as described above, in which the cooling water W flows through the first radiator hose 43, the branch pipe 20, and the second radiator hoses 44 (44L, 44R) into the upper tank 41u of the left radiator 41 and the upper tank 42u of the right radiator 42. However, in the present invention, a coupling structure such as shown in FIG. 17 may be employed.

More specifically, the arrangement is such that the upper tank 41u of the left radiator 41 and the upper tank 42u of the right radiator 42 are connected to each other through a fifth radiator hose 45a. Thus, the cooling water W flowing into the upper tank 42u of the right radiator 42 also flows into the upper tank 41u of the left radiator 41.

In this case, the need for the branch pipe 20 is eliminated and the number of components can be reduced. Also, it is possible to ensure a desired flow of the cooling water W without using the branch pipe 20 that is a relatively large component. Thus, it is possible to miniaturize the radiator body 40.

The invention being thus described, the present invention is not limited to the foregoing embodiments, and various modifications may be made. For example, in the foregoing embodiments, the extension portion 51 is constructed to extend forward of the vehicle, but also may extend rearwardly of the vehicle. In addition, in the foregoing embodiments, two extension portions 51 for each bracket 50 are formed, but also a single extension portion or three or more extension portions may be formed. Further, the shapes of the extension portions 51 and the shapes and sizes of the indentations 55 may be changed as appropriate. Moreover, as for the position where the indentation 55 is formed, in the foregoing embodiments, the indentation 55 is formed in almost the entire area of the base of the extension portion 51. However, the indentation 55 only needs to be formed in the opposed sidewall 50e in a position overlapping the fixing portion 52 at least in the vehicle front-rear direction. Even if the indentation 55 is not formed in the bases of all extension portions 51, and in terms of the size, not extended over the entire area of the base, its advantageous effect can be exerted.

Also, while the above-described embodiment describes a motorcycle, the invention is not limited thereto, but also is applicable to various saddle-ride type vehicles including a radiator body.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A radiator structure for a saddle-ride vehicle, having a radiator body, the radiator body comprising:
   a core composed of radiating fins and tubes alternately laminated, the tubes allowing passage of cooling water, said core having a first end and a front end;
   an upper tank and a lower tank connected to each end in a longitudinal direction of the tubes to allow for storage of the cooling water; and
   a bracket disposed at one end of the core, said bracket including a first sidewall and an opposed sidewall;
   the radiator body being fixed to a body frame through the bracket;
   wherein the bracket includes two extension portions vertically provided on the bracket and extending along a vehicle front-rear direction, the extension portions having a fixing portion on a leading end thereof, the fixing portion being fixed to a mounting portion of the body frame;
   the first sidewall of the bracket is attached to the first end of the core composed of the radiating fins, said opposed sidewall being provided with indentations separated from each other, the indentations being formed in each of the two extensions in a portion of the opposed sidewall indenting the first sidewall away from the first sidewall to form a clearance between the front end of the core composed of the radiating fins, said clearance overlapping the front end of the core by bending the portion of the opposed sidewall in a direction away from the front end to form the clearance; and
   said clearance being formed in a vehicle body width direction between the indentations and the front end of the core for enabling said core to swing into said clearance when said core is subject to vibration.

2. The radiator structure for the saddle-ride vehicle according to claim 1, wherein the body frame includes a down tube extending downwardly in a vehicle-body widthwise center from a head pipe; and
   the radiator body is split into a pair of left and right halves in a position where the left and right halves sandwich the down tube therebetween in the vehicle width direction.

3. The radiator structure for the saddle-ride vehicle according to claim 1, wherein the fins and the bracket are directly fixed to each other.

4. The radiator structure for the saddle-ride vehicle according to claim 2, wherein the fins and the bracket are directly fixed to each other.

5. The radiator structure for the saddle-ride vehicle according to claim 1, wherein the fixing portion on the leading end of the extension portions is formed in a plate shape including a mounting hole;
   the mounting hole is provided with an elastic member, the elastic member clamping a peripheral edge of the mounting hole from both sides in a thickness direction of the extension portions and including a through-hole allowing a fastening screw to pass therethrough; and
   the mounting portion of the body frame and the fixing portion are fastened to each other through the elastic member.

6. The radiator structure for the saddle-ride vehicle according to claim 2, wherein the fixing portion on the leading end of the extension portions is formed in a plate shape including a mounting hole;
   the mounting hole is provided with an elastic member, the elastic member clamping a peripheral edge of the mounting hole from both sides in a thickness direction of the extension portions and including a through-hole allowing a fastening screw to pass therethrough; and the mounting portion of the body frame and the fixing portion are fastened to each other through the elastic member.

7. The radiator structure for the saddle-ride vehicle according to claim 3, wherein the fixing portion on the leading end of the extension portions is formed in a plate shape including a mounting hole;

the mounting hole is provided with an elastic member, the elastic member clamping a peripheral edge of the mounting hole from both sides in a thickness direction of the extension portions and including a through-hole allowing a fastening screw to pass therethrough; and the mounting portion of the body frame and the fixing portion are fastened to each other through the elastic member.

8. The radiator structure for the saddle-ride vehicle according to claim 1, wherein the clearance is formed adjacent to an upper front side and a lower front side of the bracket.

9. The radiator structure for the saddle-ride vehicle according to claim 1, wherein the clearance is formed adjacent to an upper rear side and a lower rear side of the bracket.

10. A radiator body comprising:

a core composed of radiating fins and tubes alternately laminated, the tubes allowing passage of cooling water, said core including a first end, a front end, an upper end and a lower end;

an upper tank connected to the upper end of the core in a longitudinal direction of the tubes to allow for storage of the cooling water;

a lower tank connected to the lower end of the core in a longitudinal direction of the tubes to allow for storage of the cooling water; and a bracket disposed at one end of the core, said bracket including a first sidewall and an opposed sidewall;

wherein the bracket includes two extension portions vertically provided on the bracket and extending along a vehicle front-rear direction, the extension portions having a fixing portion on a leading end thereof;

the first sidewall of the bracket is attached to the first end of the core composed of the radiating fins, said opposed sidewall being provided with indentations separated from each other, the indentations being formed in each of the two extensions in a portion of the opposed sidewall indenting the first sidewall away from the first sidewall to form a clearance between the front end of the core composed of the radiating fins, said clearance overlapping the front end of the core by bending the portion of the opposed sidewall in a direction away from the front end to form the clearance;

said clearance being formed in a vehicle body width direction between the indentations and the front end of the core for enabling said core to swing into said clearance when said core is subject to vibration.

11. The radiator body according to claim 10, wherein the clearance is formed adjacent to an upper front side and a lower front side of the bracket.

12. The radiator body according to claim 10, wherein the clearance is form adjacent to an upper rear side and an lower rear side of the bracket.

* * * * *